United States Patent
Taniguchi et al.

(10) Patent No.: US 6,744,147 B2
(45) Date of Patent: Jun. 1, 2004

(54) WIRE HARNESS SYSTEM

(75) Inventors: Yoshikazu Taniguchi, Yokkaichi (JP); Masatoshi Nakashima, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 200 days.

(21) Appl. No.: 10/160,038

(22) Filed: Jun. 4, 2002

(65) Prior Publication Data

US 2002/0180271 A1 Dec. 5, 2002

(30) Foreign Application Priority Data

Jun. 5, 2001 (JP) ........................................ 2001-170185

(51) Int. Cl.[7] ................................................. B60L 1/00
(52) U.S. Cl. ..................................... 307/10.1; 370/498
(58) Field of Search ...................... 370/498, 531–545; 307/10.1, 10.6; 439/502–504

(56) References Cited

U.S. PATENT DOCUMENTS

2002/0019165 A1 * 2/2002 Aoki et al. ................. 439/502

FOREIGN PATENT DOCUMENTS

| JP | A 10-22006 | 1/1998 | |
| JP | 2002368766 A | * 12/2002 | ........... H04L/12/40 |

* cited by examiner

*Primary Examiner*—Shawn Riley
(74) *Attorney, Agent, or Firm*—Oliff & Berridge, PLC

(57) ABSTRACT

A wire harness system is constructed by node connectors including multiplex communication controllers. A token reception controller for receiving a token through a timing bit set that is issued for each predetermined time period is provided for the multiplex communication controllers of the node connectors. A controller including a CPU is provided only for a specific node connector, and the multiplex communication controllers permit multiple node connectors to use, in common, data that is stored in this controller.

4 Claims, 8 Drawing Sheets

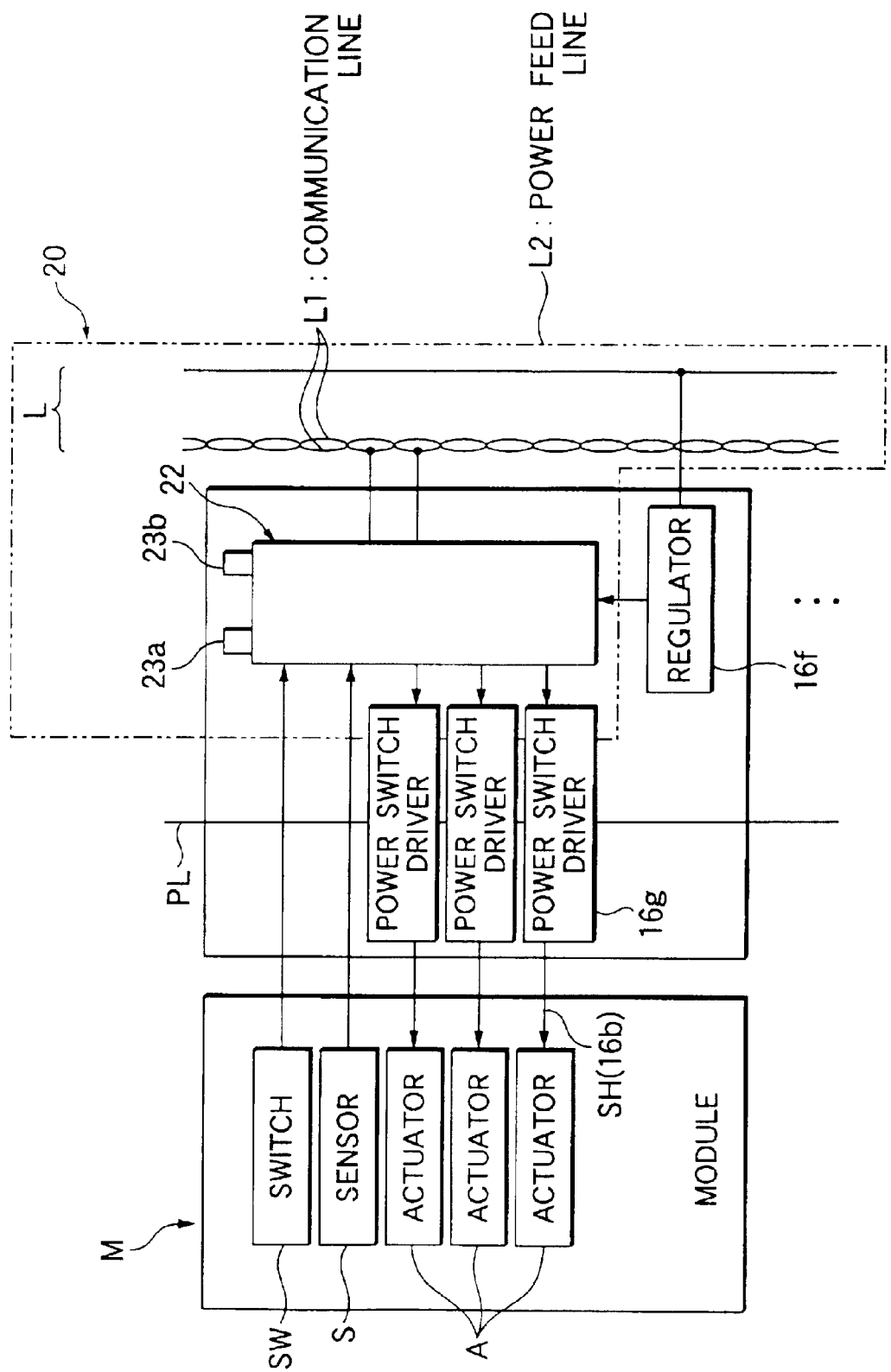

WIRE HARNESS SYSTEM

BACKGROUND OF THE INVENTION

1. Field of the Invention

The present invention relates to a wire harness system.

2. Description of the Related Art

Recently, accompanying the outstanding development of electronics for vehicles, attempts have been made to form into modules various electronic units for mounting on vehicles, and to connect such individual modules together using a system that employs multiplex communication.

For example, disclosed in JP-A-10-22006 is a system wherein multiple actuators are arranged in a vehicle, and wherein, individually provided for each of these interface connectors, are multiplex communication control units that employ a LAN built into the vehicle.

According to this conventional technique, a protocol is established between the interface connectors by providing a CPU (Central Processing Unit) for each multiplex communication unit and by employing a communication method, such as a polling or a token passing method or the CSMA/CD method.

However, the conventional technique requires the establishment of a communication state among the multiplex communication units that are respectively provided for the interface connectors in a vehicle. Therefore, when the control data for multiple actuators are uniformly managed, the data transmission time is extended and practical control cannot be exercised. Accordingly, for the transmission or reception of data, it is extremely difficult to construct a large network that includes multiple actuators. And furthermore, when a communication problem occurs at a device installed in the vehicle and it is necessary to determine whether the problem is the result of a communication program malfunction or whether the problem originated at one, or at a combination, of the interconnected devices, since the system is one wherein communication is established by providing a CPU for each communication control unit, the source of the problem cannot easily be identified.

To resolve this shortcoming, a memory may be provided for each interface connector for the distribution of control data. However, in this case, either an extended processing time would be required to update the database of a host and the control data stored in the memories of the interface connectors, or a data transfer error could occur. Therefore, the number of actuators that could be connected to the individual interface connectors would be limited, and to construct a large communication system, the costs incurred for the required interface connectors would rise. Furthermore, since the time required to update data would also be increased, in consonance with the number of interface connectors, this configuration would not be appropriate for an actuator that must perform frequent transactions. Thus, it would be difficult to provide a practical large network, even when data used in common is provided for each interface connector.

SUMMARY OF THE INVENTION

To resolve the problems, it is one objective of the present invention to provide a wire harness system that can process data at a practical and an appropriate communication speed, even when control data is uniformly managed, and can thus enable the construction of a large network that includes multiple actuators.

To achieve this objective, according to the invention, a wire harness system comprises:
  slave node connectors to be connected to multiple actuators;
  a master node connector, including a controller for controlling the actuators connected to the slave node connectors; and
  a multiplex communication system, for performing multiplex communication among the master node connector and the slave node connectors, including
    a node address setting unit, for setting different node addresses for the node connectors,
    token calling section, for one of the node connectors, provided for issuing a timing bit set as a token signal for each predetermined period of time, and
    a token reception unit, for employing the timing bit set issued by the token calling section and the node addresses to provide a token for each of the node connectors in a time division manner.

According to the invention, when the controller provided for the master node connector performs multiplex communication with the slave node connectors in order to control the actuators, the token is provided for each node connector in a time division manner using the timing bit set that is issued as a token signal for each predetermined period of time and the node addresses set for the node connectors. Thus, a communication condition need not be established between the node connectors that exchange data, and the transmission/reception of data is enabled in a protocol-free state. Therefore, since among the node connectors the response time that is required for the exchange of data is drastically reduced, a large network incorporating multiple actuators can be constructed, and as for the actuators, control data that is be transmitted to the master node connector can be uniformly managed.

In addition, since a communication state is not established between the master node connector and the slave node connectors, a microprocessor need not be provided for the slave node connectors, thereby enabling the provision of a simple and inexpensive hardware configuration.

Further, since a complete time-division multiplex communication method is employed, the timing bit set output for each predetermined time and the node addresses need only be set so as to enable multiplex communication among the connectors. Therefore, the number of slave node addresses can be easily changed, and a change in the hardware specification for the wire harness can be easily coped with. As a result, when the wire harness of the invention is employed for a vehicle, a communication system that does not depend on the vehicle model can be constructed.

The slave node connectors and the actuators maybe connected by using a conventional wire harness, or the slave node connectors may be directly connected to the actuators.

Preferably, each of the node connectors includes a semiconductor relay for driving an actuator that is to be connected.

Since with this configuration the semiconductor relay for which maintenance is not required is distributed to each node connector, a conventional electric connection box need not be provided to correctly manage the drive relay, and the number of parts and cables can be reduced even more.

It is more preferable that the token calling section be provided for all of the node connectors, and that token adjustment section for adjusting the token signal based on the setting of the node addresses be provided for each of the token calling section, so that a data packet to be transmitted to one node connector can be received by another connector.

Since with this configuration, not only the master node connector but also all the other node connectors can serve as the master node, the system will not overall be halted when a fault occurs at the master node connector. That is, a degenerating operation can be performed by each of the node connectors that are connected to the multiplex communication path.

It is also preferable that the node connectors include a power feed switch connected to a power feed line along which power is supplied to the actuators.

In this case, the supply of power to the actuators can also be performed through multiplex communication.

BRIEF DESCRIPTION OF THE DRAWINGS

FIG. 8 is a block diagram showing an additional embodiment of the invention.

DETAILED DESCRIPTION OF THE PRESENT INVENTION

A preferred embodiment of the present invention will now be described in detail referring to the accompanying drawings.

Figure 1:
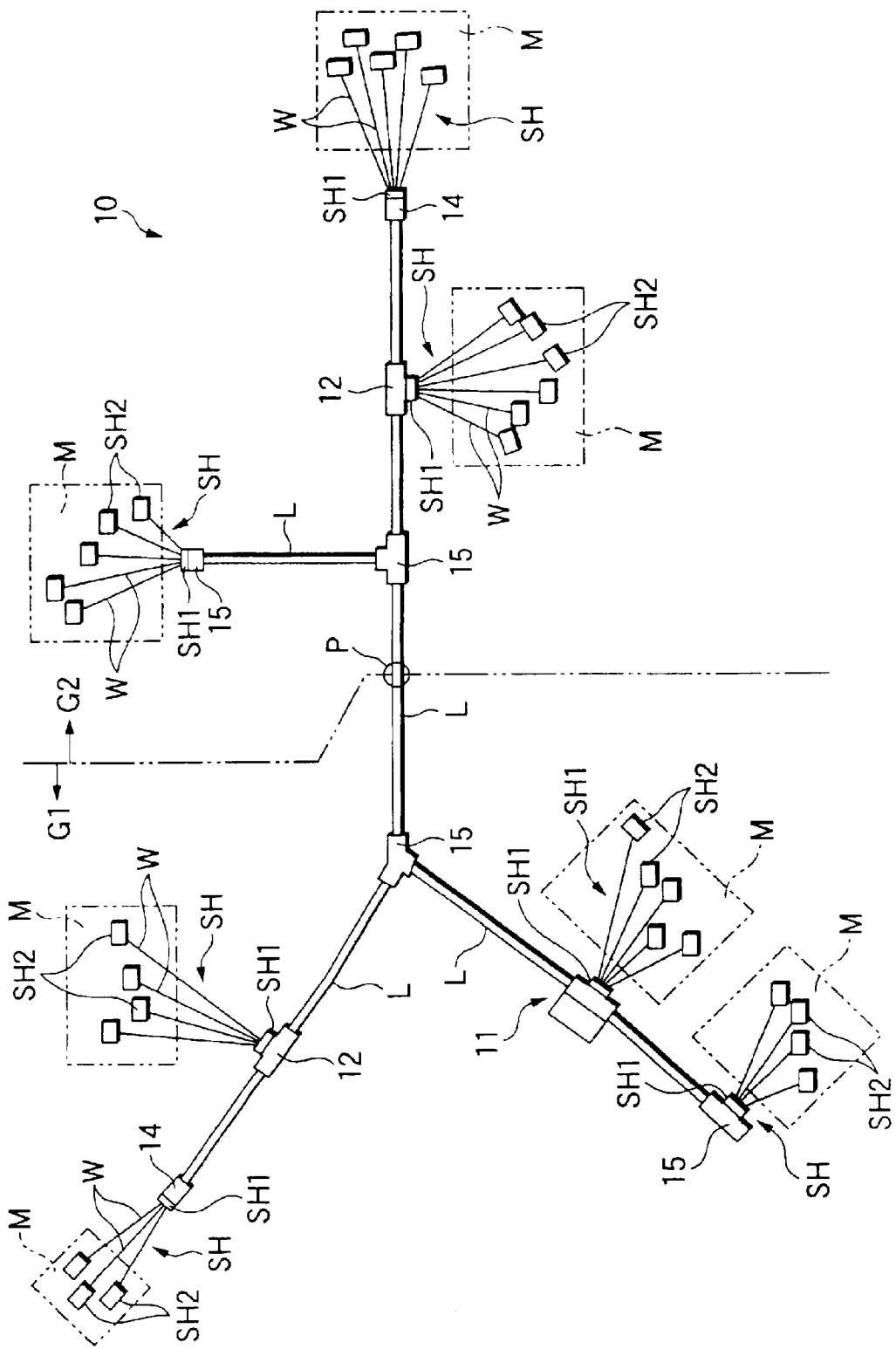
FIG. 1 is a schematic diagram showing a simplified wire harness system according to one embodiment of the present invention.
Figure 2:
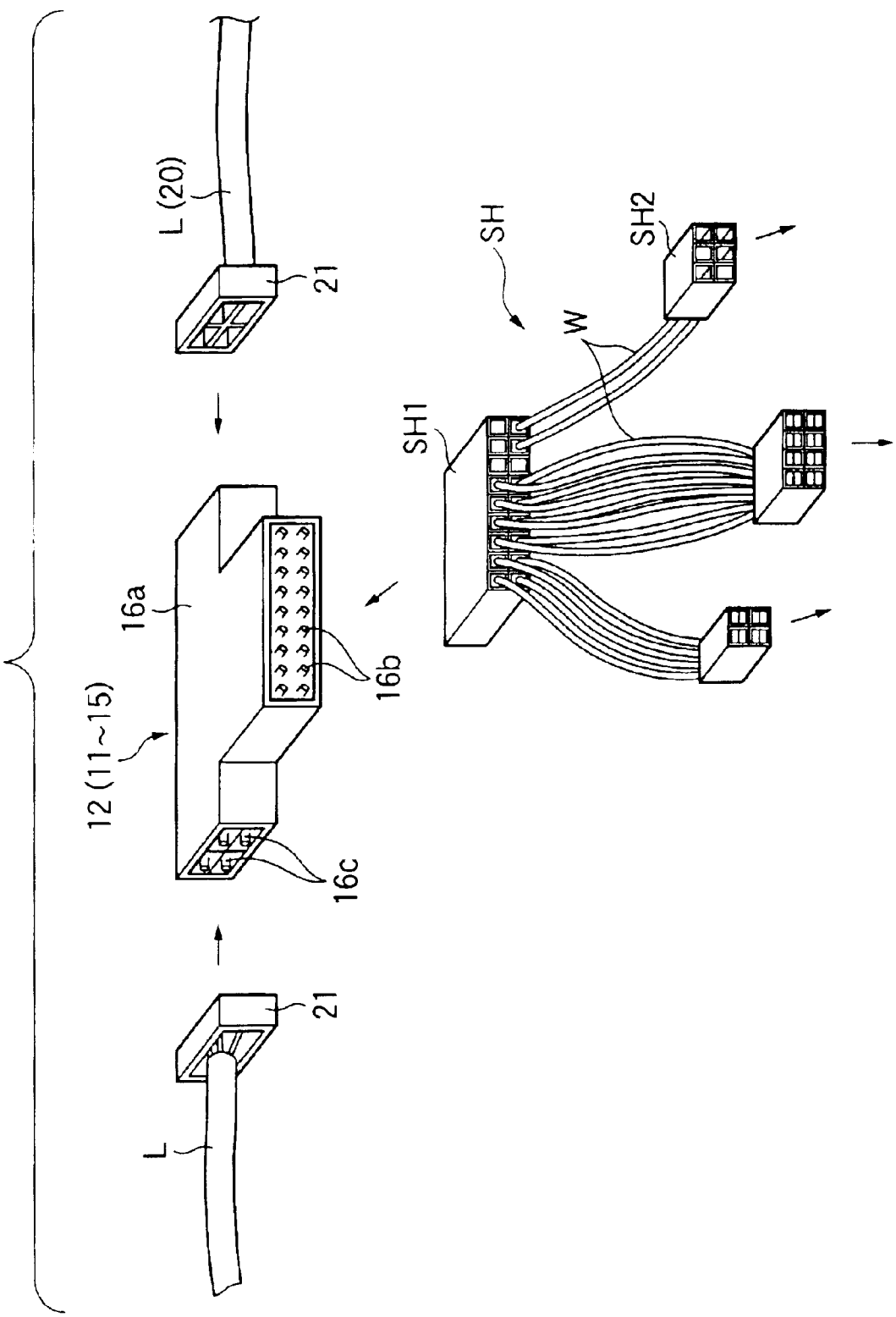
FIG. 2 is a specific perspective view of the essential portion of the system in FIG. 1.

FIG. 1 is a schematic diagram showing a simplified configuration for a wire harness system 10 according to one embodiment of the invention. FIG. 2 is a specific perspective view of the essential portion of the configuration in FIG.

In FIGS. 1 and 2, the wire harness system 10 includes sub-harnesses SH, which are connectable to modules M that serve as actuators, multiple node connectors 11, 12, 14 and 15, which are to be connected to the sub-harnesses SH, and a multiplex communication system 20, for providing multiplex communication for the node connectors 11, 12, 14 and 15.

As is shown in FIG. 2, as the sub-harnesses SH, harness connectors SH1, which are to be connected to the node connectors 11 to 15, are connected by coated powerlines W to module connectors SH2, for connection to the modules M (see in FIG. 1), so that the node connectors 11 to 15 and the modules M can be so connected that they can be controlled.

Each of the node connectors 11 to 15 includes a housing 16a, a module terminal 16b, which is incorporated in the housing 16a and is to be connected to the harness connector SH1 of the sub-harness SH, and a communication terminal 16c, which is also incorporated into the housing 16a and is to be connected to a connector 21 of a multiplex communication system 20 that will be described later. The node connectors 11 and 12 are connected by the module terminals 16b to the modules M through the sub-harnesses SH, and are also connected by the communication terminals 16c to the multiplex communication system 20 so that together they can perform multiplex communication. The shape of the housing 16a, and the terminals 16b and 16c are changed as needed depending on the connections of the node connectors 11 to 15. For example, for the node connector 14 that constitutes the terminal portion of the wire harness system 10, there is only one socket portion for the communication terminal 16c. Further, for the node connector 15 that relays a compound line L for the multiplex communication system 20, which will be described later, the module terminal 16b is not provided.

Figure 3:
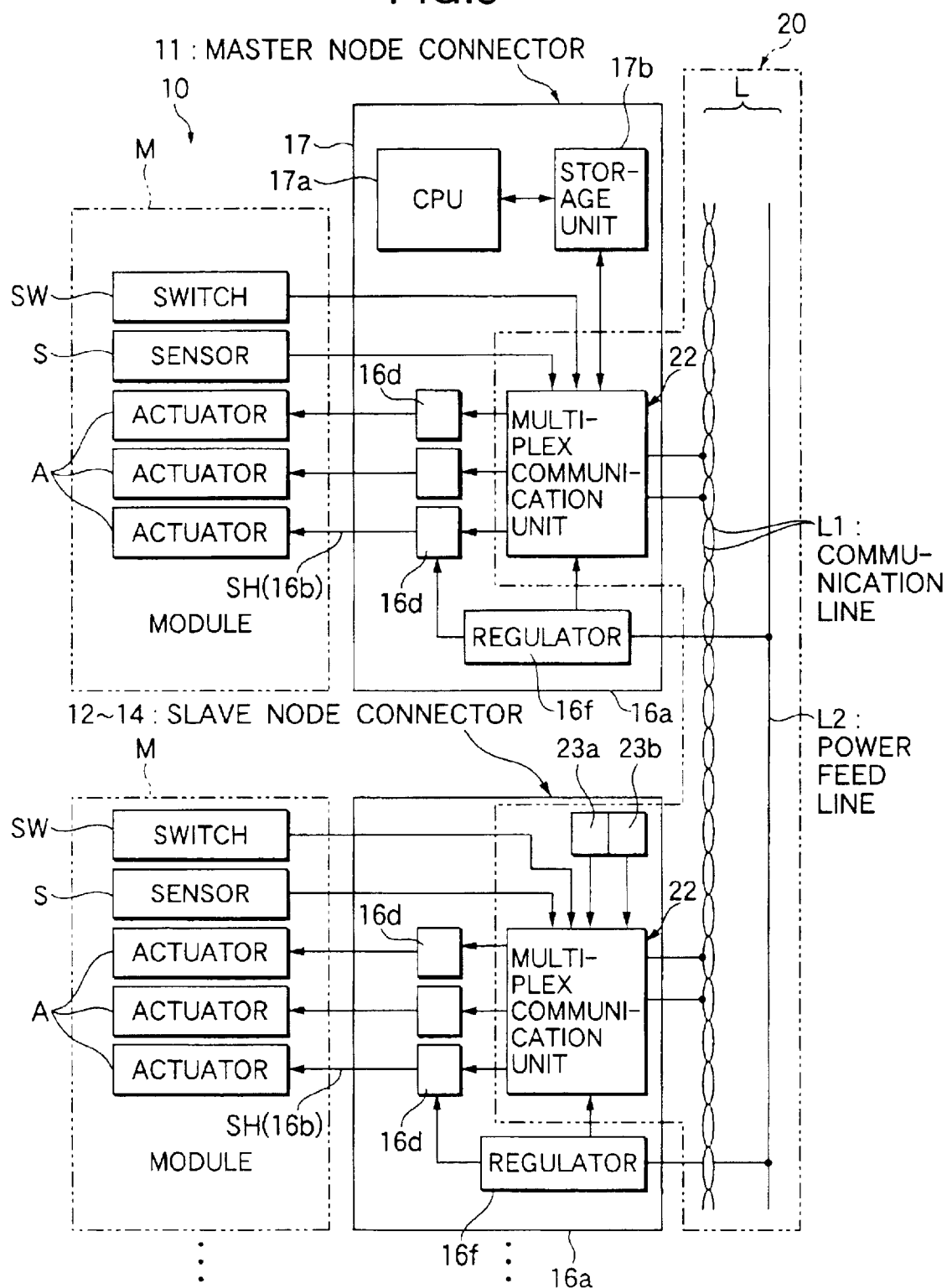
FIG. 3 is a block diagram showing the wire harness system in FIG. 1 according to the embodiment.

FIG. 3 is a block diagram showing the wire harness system 10 in FIG. 1 for the embodiment.

In FIG. 3, the node connectors 11 to 14 commonly include a semiconductor relay 16d, for driving an arbitrary type of actuator A incorporated in the module M, and a regulator 16f, for supplying power to the semiconductor relay 16d. The specific node connector 11 is used as a master node connector wherein a controller 17 is provided. A control signal received from the master node connector 11 is transmitted through the multiplex communication system 20 to the semiconductor relay 16d, which includes a local station, so that, based on a single database, the modules M (or the actuators A) can be controlled. In addition, a sensor S and a switch SW, included in each module M, are connected to the multiplex communication system 20. In this embodiment, the semiconductor relay 16d is a well known one that incorporates a self-protection function/diagnostic function.

The controller 17, provided for the master node connector 11, includes a CPU 17a and a storage unit 17b.

The storage unit 17b includes a ROM (Read Only Memory) and a RAM (Random Access Memory). A control program, which permits the CPU 17a to function as a control unit for each module M, and an address setting program, for providing the node address for the multiplex communication system 20, are stored in the ROM. The RAM is used as a work area for the CPU 17a.

The multiplex communication system 20 for this embodiment will now be described in detail.

In FIG. 3, the multiplex communication system 20 includes a compound line L, which forms a bus type LAN (Local Area Network), and multiplex communication units 22, respectively provided for the node connectors 11 to 14.

The compound line L is a set including a twisted pair line L1, which serves as the communication line for the multiplex communication units 22, and a power feed line L2, along which power is supplied to the regulators 16f of the node connectors 11 to 14. Although not shown, a network terminator is connected to the terminal of the twisted pair line L1.

Basically, each multiplex communication unit 22 includes a local node address setting switch 23a and a transmission source node address setting switch 23b. Using the node address setting switches 23a and 23b, a different local node address and a transmission source node address (in this embodiment, an address that is set as a local node address for the multiplex communication unit 22 of the master node connector 11) can be set.

It should be noted that for the multiplex communication unit 22 provided for the master node connector 11, the local node address and the transmission source node address are set by the controller 17.

Figure 4:
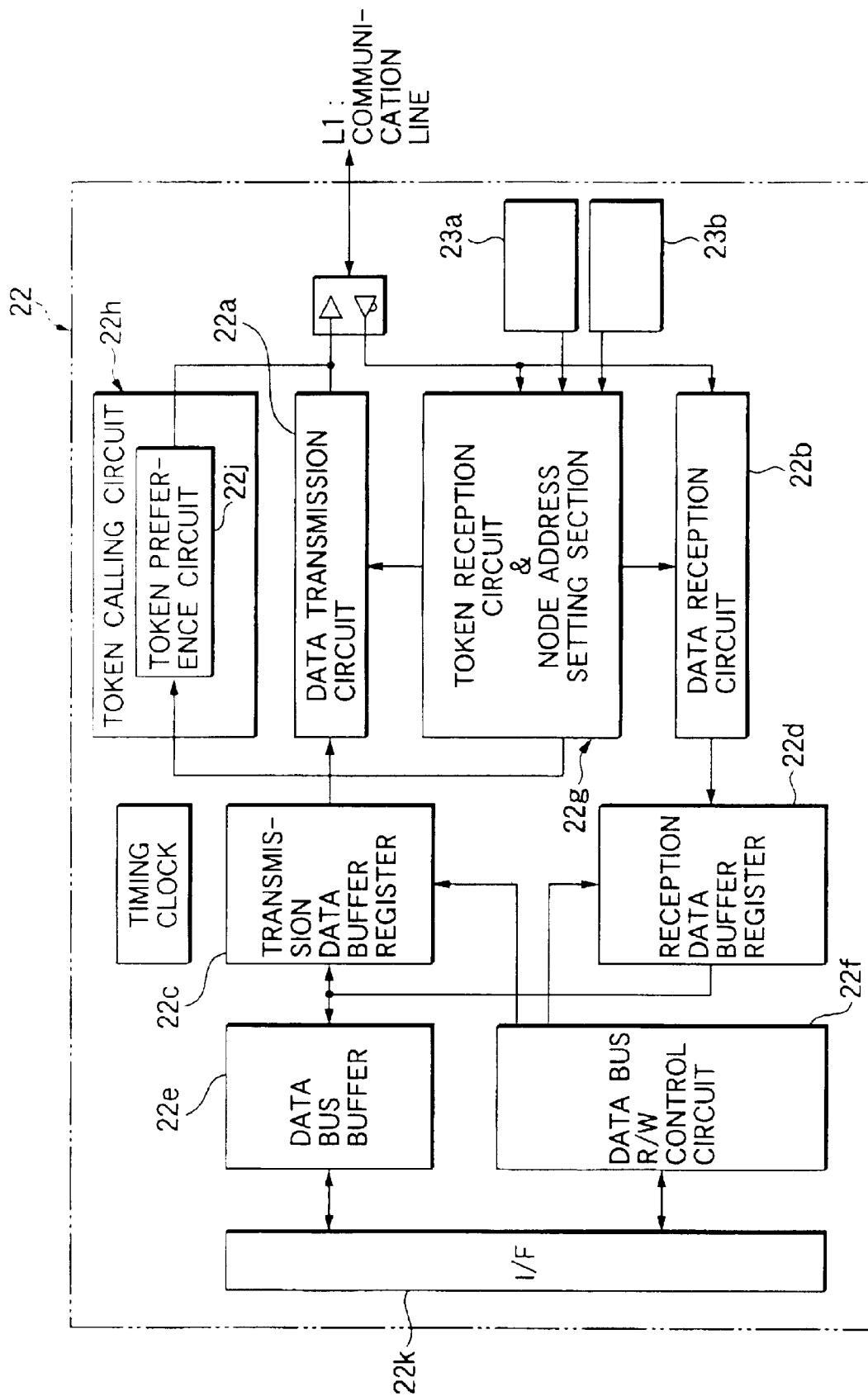
FIG. 4 is a detailed block diagram showing a multiplex communication controller according to the embodiment.

FIG. 4 is a detailed block diagram showing the multiplex communication unit 22 according to the embodiment.

In FIG. 4, the multiplex communication unit 22 is basically constituted by an IC chip, and internally includes a data transmission circuit 22a, for transmitting data to the communication line L1, a data reception circuit 22b, for receiving data transmitted along the communication line L1, a transmission data buffer register 22c and a reception data buffer register 22d, provided in correlation with the circuits 23a and 23b, a data bus buffer 22e, for permitting the exchange of data by the data bus buffer registers 22c and 22d and the actuators A (see FIG. 3), and a data bus R/W control circuit 22f, for controlling the writing and reading of data for the data bus buffer registers 22c and 22d. With these components 22a to 22f, data can be exchanged by the controller 17 of the master node connector 11 and the actuators A.

The multiplex communication unit 22 also includes: a token reception circuit 22g, for receiving, along the communication line, a token signal that will be described later and for employing a received token signal to control the transmission/reception of data by transmission circuit 22a and the data reception circuit 22b; and a token calling circuit 22h, for issuing a token signal, under the control of the token reception circuit 22g, to the communication line L1. When the token reception circuit 22g receives a local node address and a transmission source address that are set for the corresponding node connectors 11 to 14, the token reception circuit 22g can correlate the node addresses of all the node connectors 11 to 15, including the local node, with the tokens by using the timing for a token signal, transmitted to the communication line L1, and the local node address that has been set, and based on the token correlated with the local station, can transmit data to or receive data from the communication line L1. The token calling circuit 22h outputs a timing bit set for each predetermined period of time, so that, in accordance with the transmission timing for the timing bit set, a token can be provided for all the node connectors 11 to 15, including the local station.

The multiplex communication units 22 and the modules M are connected through parallel interfaces 22k.

Figure 5:
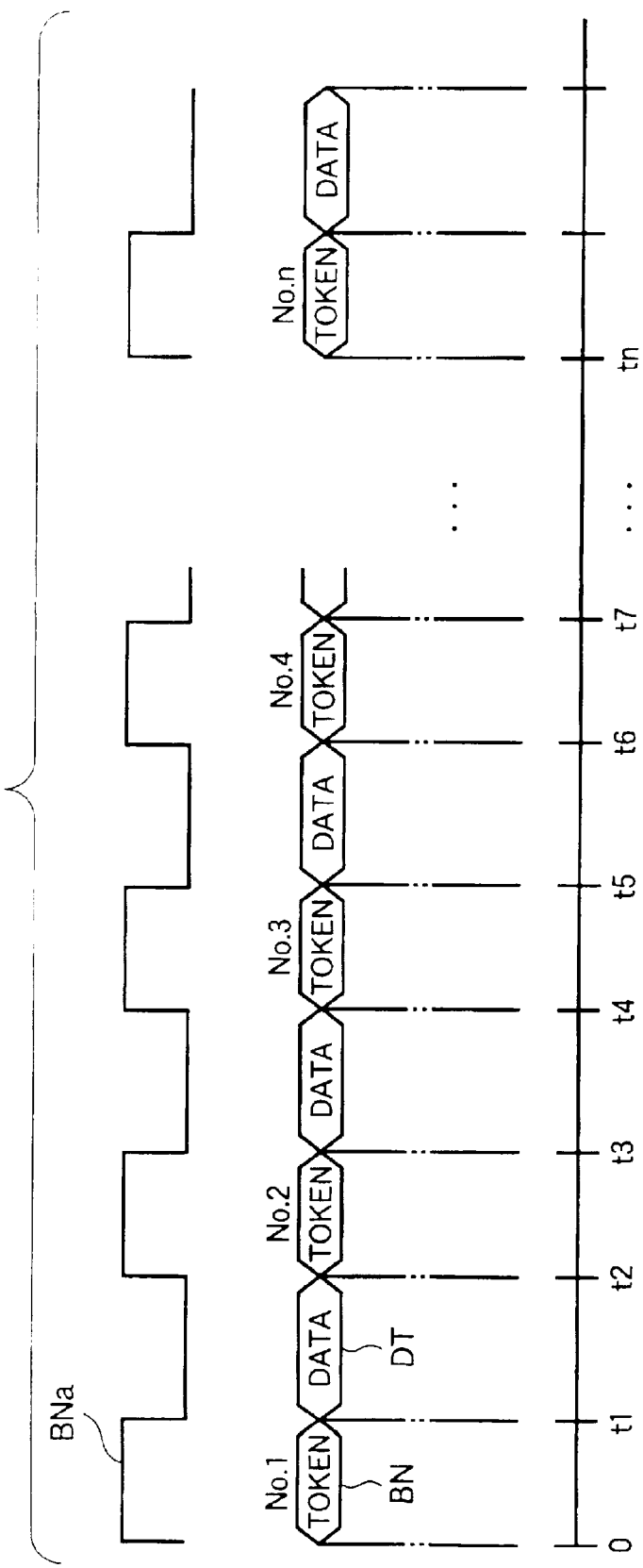
FIG. 5 is a diagram showing the state for the complete time-division multiplex communication performed by a master unit according to the invention.

FIG. 5 is a diagram showing the state of the complete time-division multiplex communication performed by the master unit according to the invention.

In FIG. 5, the horizontal axis represents the time, Bna denotes a calling cycle for a token signal that is issued by the token calling circuit 22h, and BN denotes a timing bit set that has been issued as a token signal. In the example in FIG. 5, the timing bit set is output by a broadband type frequency modulation method.

The token calling circuit 22h in this embodiment repetitively issues a token signal during a time cycle extending from 0 to t2. During the first half of the period, from 0 to t1, t2 to t3, t4 to t5, t6 to t7, . . . , the token calling circuit 22h issues a token signal as a timing marker, and during the second half of the period, t1 to t2, t3 to t4, t5 to t6, . . . , the data transmission circuits 22a of the node connectors 11 to 15, which have local node addresses that match the timing for the token signal that is issued, output data DT to the communication line L1. With this setup, since the token calling circuit 22h sequentially repeats the issue of timing bit sets BN in a number equivalent to the number of units, the token signal can be provided for all the node connectors 11 to 15, including the local station.

For a wire harness mounted on a vehicle, the information change transmission request speed is known, based on a signal type, such as a vehicle type signal or a control signal, and data is transmitted at a speed sufficiently higher (equal to or greater than a multiple of five) than the information change transmission request speed for each signal type.

When the signal transmission request speed is 10 ms, the cycle time for the token signal is set as 1 ms.

For an example system including eight nodes, one node is transmitted at a cycle of 0.125 ms. As a result, without any deterioration of the system function, the actuators A of the individual modules M can be operated in the same manner as when they are connected to the conventional wire harness.

In this embodiment, since a token signal is issued by all the token calling circuits 22h provided for the node connectors 11 to 15, as is shown in FIG. 4, a token preference circuit 22j constituted in accordance with hard logic is provided for the token calling circuit 22h, and is so set that only the token calling circuit 22h having the smallest node address outputs a token signal.

Further, since the token reception circuit 22g and the data reception circuit 22b monitor the communication line L1, which is used in common and to which the token signal BN and the data DT are output, both of the circuits 22g and 22b can share the data DT output by any node connector unit.

As a result, even if the communication line L1 is cut at any location, multiplex communication can be performed, since any one of the node connectors can serve as a master node, and the degenerating operation for maintaining the communication function can be performed to the extent possible after the occurrence of the accident. When the communication line L1 is cut at point P in FIG. 1, the communication function is maintained in two groups G1 and G2, which are separated at the point P.

As for the node connector 15 located at the relay position of the compound line L, since the same communication mechanism as for the other slave node connectors 12 to 14 is provided, except that the semiconductor relay 16d in FIG. 3 is eliminated, no detailed explanation will be given for the node connector 15.

As is described above, according to the embodiment, when the controller 17, which is the control unit provided for the master node connector 11, permits the actuators A of the modules M to perform multiplex communication with the slave node connectors 12 to 15, as is shown in FIG. 5, a token signal is provided for the node connectors 11 to 15 in a time division manner in accordance with the timing bit set BN issued for each predetermined time period, and the node addresses set for the node connectors 11 to 15. A communication state need not be established between the node connectors 11 to 15 that exchange data, and the transmission/reception of data in the protocol-free state is enabled. Therefore, since the response time required for the node connectors 11 to 15 that exchange data is drastically reduced, the data can be processed at a practical and appropriate communication speed, even when the control data for the actuators A, which is to be transmitted to the master node connector 11, can be uniformly managed. Thus, a large network can be constructed.

Further, since the communication state need not be established between the master node connector 11 and the slave node connectors 12 to 15, a microprocessor need also not be provided for the slave node connectors 12 to 15, and a simple and inexpensive hardware configuration can be obtained.

In addition, since multiplex communication is performed between the master node connector 11 and the slave node connectors 12 to 15, the number of lines between the connectors 11 to 15 can be reduced.

Furthermore, since the complete time-division communication method is employed, the number of slave node connectors 12 to 15 can be easily changed, and a change in the hardware specifications for the wire harness system 10 can be easily coped with. Therefore, when the wire harness system 10 is employed for a vehicle, a communication system that does not depend on the model of the vehicle can be constructed.

Especially in the embodiment, since the node connectors 11 to 15 include the semiconductor relays 16d for driving the connected actuators A, the conventional electric connection box need not be provided to collectively manage the drive relay, and the number of required parts and the number of lines can be even more reduced.

Moreover, in this embodiment, the token calling circuit 22h is provided as token calling section for the multiplex communication controllers of the node connectors 11 to 15, the token preference circuit 22j is provided as the token adjustment section for employing the designated node addresses to adjust the token signal DT issued by each token calling circuit 22h, and a data packet transmitted to one of the node connectors can be received by another node connector. Therefore, with this configuration, not only the master node connector 11, but also any other node connector 12 to 15 can serve as the master node. Thus, even when a fault occurs at the master node connector 11, the entire system is not halted. That is, the degenerating operation can be performed by each node connector connected to the multiplex communication path.

Figure 6:
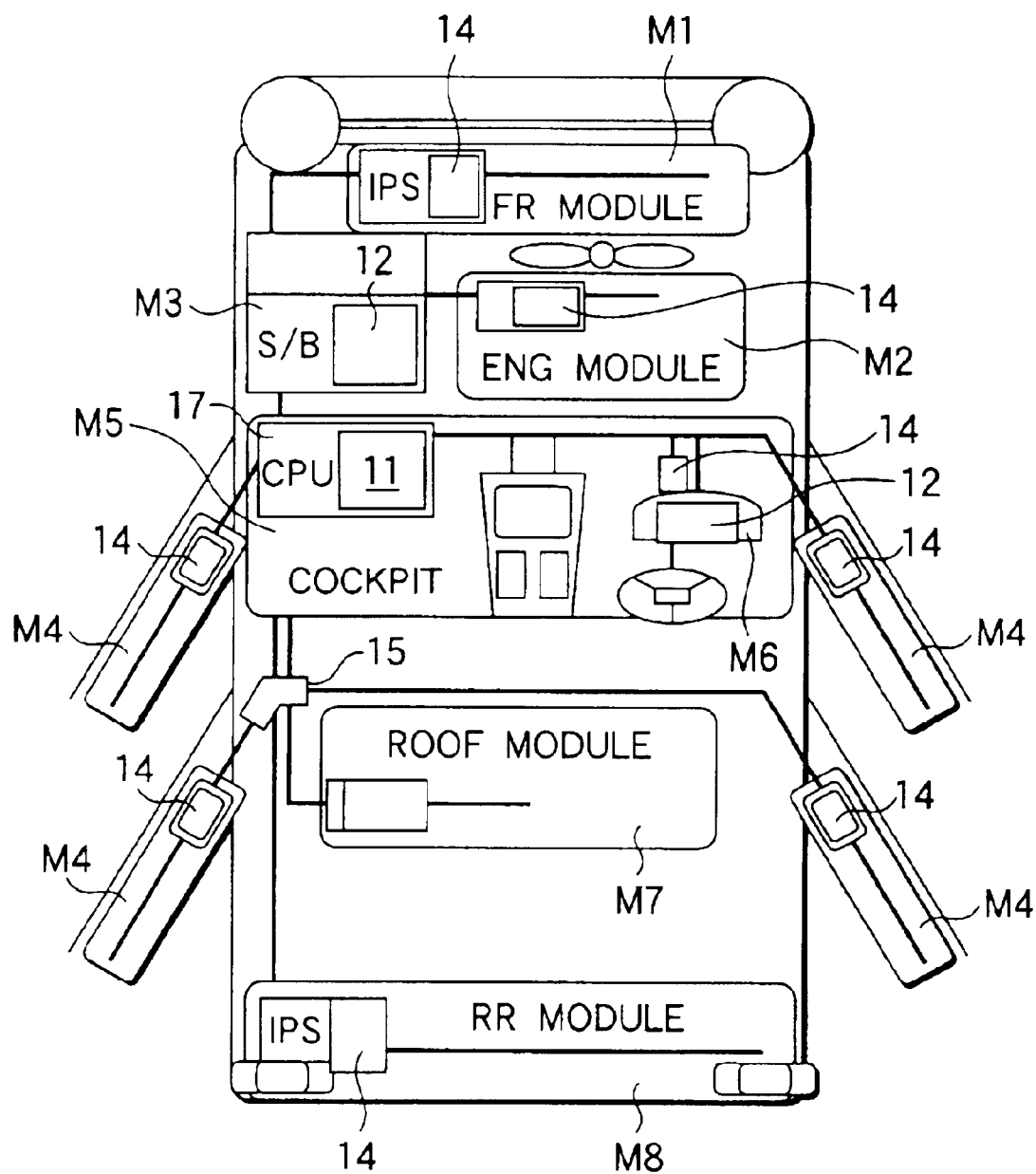
FIG. 6 is a specific diagram showing an example wherein a wire harness for a vehicle is provided as the embodiment of the invention.

FIG. 6 is a specific diagram showing an example wherein the invention is embodied as a vehicular wire harness. As is shown in FIG. 6, mounted in a vehicle is a vehicular wire harness system 10 that comprises an FR module M1, an engine module M2, a safety box module M3, a door module M4, a main module M5, which is mounted in an instrument panel, a steering module M6, a roof module M7 and an RR module M8.

In this case, when multiplex communication is performed while the node connector 11 connected to the main module MS is used as a main node, a simple and inexpensive communication system that does not require a conventional electric connection box can be constructed using the modules M1 to M8, and the control data stored in the controller 17, which is connected to the node connector 11, can be used in common to enable uniform data management.

As is described above, according to the embodiment, even when the control data is uniformly managed, the data can be processed at a practical and appropriate communication speed, so that to provide great effects, a large network having an inexpensive hardware configuration, and including multiple actuators A, can be constructed.

This embodiment is merely one preferred example for the invention, and the invention is not limited to this embodiment.

A conventional wire harness may be employed to connect the slave node connectors 12 to 15 and the actuators A, or the actuators may be directly connected to the slave node connectors 12 to 15.

Figure 7:
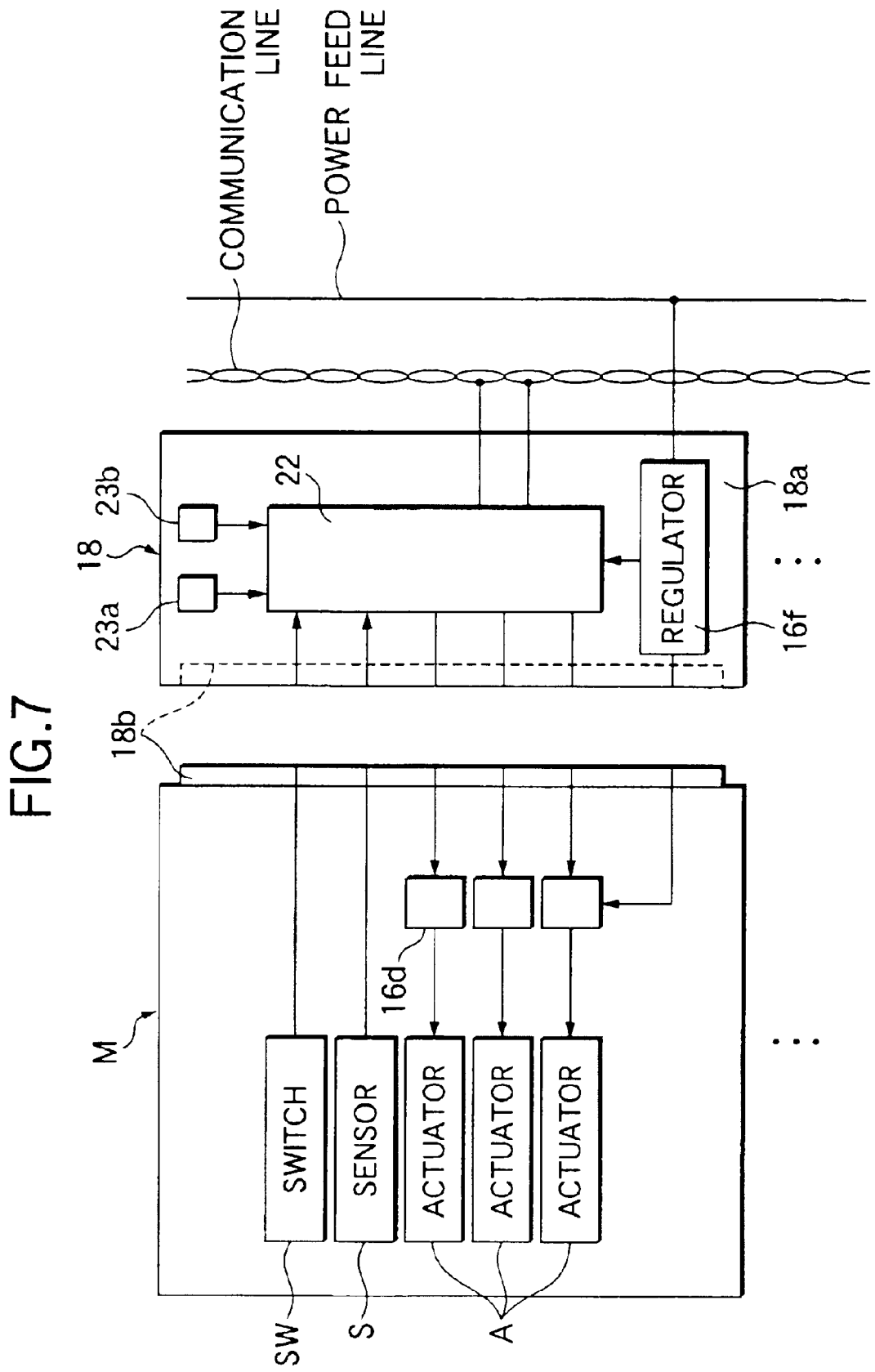
FIG. 7 is a block diagram showing another embodiment of the invention.

Further, the configuration shown in FIG. 7 may be employed.

FIG. 7 is a block diagram showing another embodiment of the invention.

In FIG. 7, for a node connector 18, only a regulator 16f and a multiplex communication controller 22, for a multiplex communication control system 20, are included in a housing 18a, and a module M is connected directly to the node connector 28 by a connector 18b provided for the housing 18a. In this embodiment, the semiconductor relay 16d in FIG. 3 is incorporated directly into the module M, and the regulator 16f and the multiplex communication controller 22 are electrically connected through the connector 18b. When this configuration is employed, merely by making a slight change of the specifications for the module M, the sub-harnesses SH are not required, so that the number of lines can be even further reduced.

The configuration in FIG. 8 may also be employed.

FIG. 8 is a block diagram showing an additional embodiment of the invention.

In FIG. 8, for a node connector 19, for control, a power switch driver 16g, which is to be connected to a power line PL, along which power is supplied to actuators A for modules M, is connected to a multiplex communication controller 22. A transistor device, such as an MOSFET (Metal Oxide Semiconductor Field Effect Transistor), is preferable as the power switch driver 16g. With this configuration, the power supply to the actuators A can also be controlled by the multiplex communication system 20.

It is natural that the present invention can be variously modified without departing from the scope of the invention.

As is described above, according to the invention, even when control data is uniformly managed, the data can be processed at a practical and appropriate communication speed, so that to obtain great effects, a large network having an inexpensive hardware configuration, and including multiple actuators, can be constructed.

What is claimed is:

1. A wire harness system comprising:
    slave node connectors to be connected to multiple actuators;
    a master node connector, including a controller for controlling the actuators connected to the slave node connectors; and
    a multiplex communication system, for performing multiplex communication among the master node connector and the slave node connectors, including
        a node address setting unit, for setting different node addresses for the node connectors,
        token calling section, for one of the node connectors, provided for issuing a timing bit set as a token signal for each predetermined period of time, and
        a token reception unit, for employing the timing bit set issued by the token calling section and the node addresses to provide a token for each of the node connectors in a time division manner.

2. The wire harness system as claimed in claim 1, wherein each of the node connectors includes a semiconductor relay for driving an actuator that is to be connected.

3. The wire harness system as claimed in claim 1, wherein the token calling section is provided for all of the node connectors; and wherein token adjustment section for adjusting the token signal based on the setting of the node addresses is provided for each of the token calling section, so that a data packet to be transmitted to one node connector can be received by another connector.

4. The wire harness system as claimed in claim 1, wherein the node connectors include a power feed switch connected to a power feed line along which power is supplied to the actuators.

* * * * *